United States Patent [19]

Hirata

[11] 4,426,692
[45] Jan. 17, 1984

[54] ROTARY RECORDING MEDIUM HAVING AN IMPROVED THREE FREQUENCY PICKUP TRACKING CONTROL AND REPRODUCING APPARATUS THEREFOR

[75] Inventor: Atsumi Hirata, Fujisawa, Japan

[73] Assignees: Victor Company of Japan, Ltd., Yokohama, Japan

[21] Appl. No.: 232,222

[22] Filed: Feb. 6, 1981

[30] Foreign Application Priority Data

Feb. 7, 1980 [JP] Japan .................................. 55-13020

[51] Int. Cl.³ ...................... G11B 21/12; G11B 21/10; G11B 21/08
[52] U.S. Cl. ......................................... 369/32; 369/33; 369/41; 369/43; 369/47; 369/126; 369/276
[58] Field of Search ................................ 358/127–132, 358/342; 369/32–33, 41, 43, 275–279, 47, 126, 184, 225–226, 230–231; 360/72.2, 74.4, 77–78

[56] References Cited

U.S. PATENT DOCUMENTS 4,330,879 5/1982 Wine ........................................ 369/32
4,331,976 5/1982 Kinjo et al. ....................... 358/128.6

Primary Examiner—Raymond F. Cardillo, Jr.
Attorney, Agent, or Firm—Louis Bernat

[57] ABSTRACT

A rotary recording medium has at least one surface on which a spiral main track is formed with a reference signal track disposed centrally between mutually adjacent track turns. The track turns of the main track have an information signal recorded thereon. First and second reference signals are recorded alternately on the reference signal track, and a third reference signal is recorded at changeover positions on the recording medium. The three reference signals control a pickup guiding servo system. To identify specific places on the recorded disc, the third reference signal is recorded during extra long periods, with identification being made on a basis of the lengths of those long periods.

6 Claims, 6 Drawing Figures

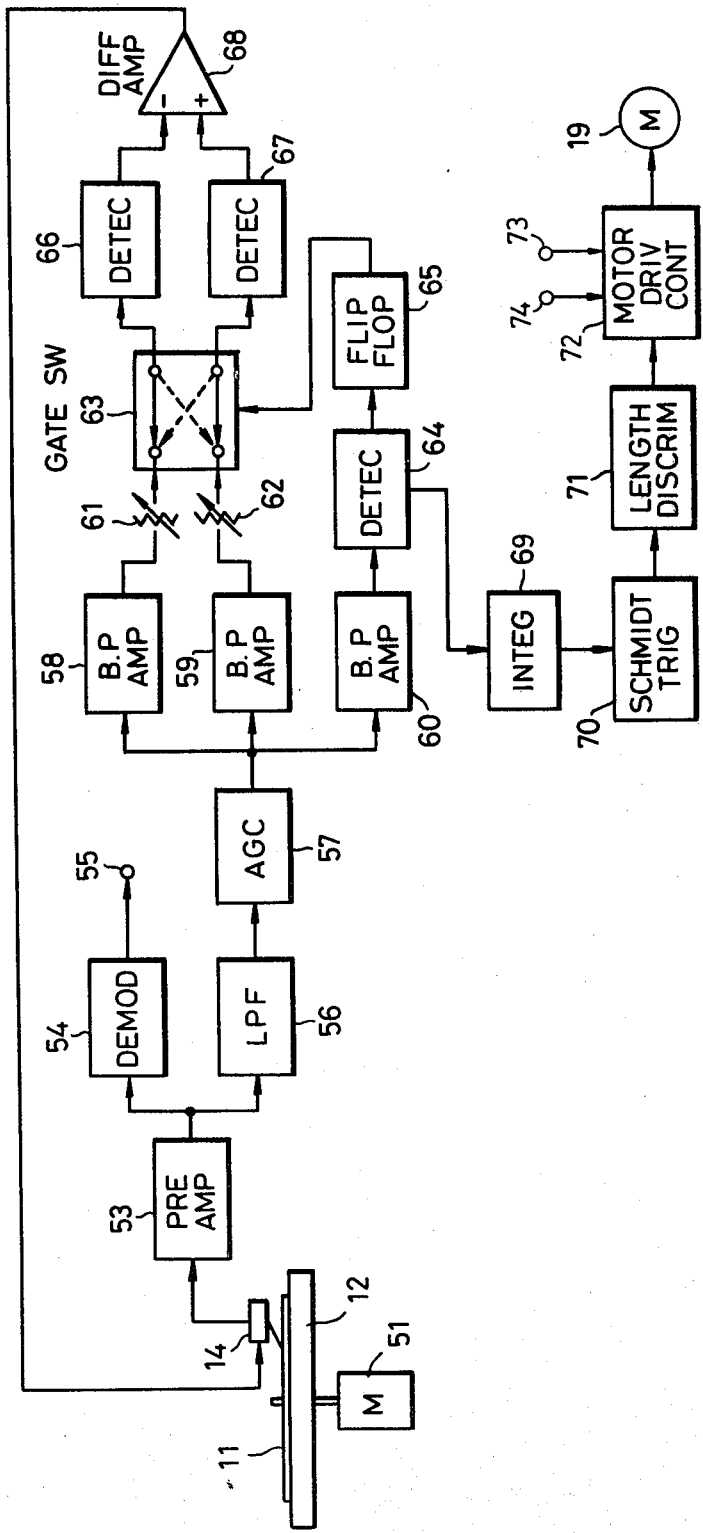

ROTARY RECORDING MEDIUM HAVING AN IMPROVED THREE FREQUENCY PICKUP TRACKING CONTROL AND REPRODUCING APPARATUS THEREFOR

BACKGROUND OF THE INVENTION

The present invention relates generally to rotary recording mediums and to reproducing apparatus therefor.

More particularly, the invention relates to a rotary recording medium of the type wherein three kinds of reference signals are used for controlling tracking of a reproducing tracing element. The reference signals are recorded on opposite sides of a continuous spiral track, to enable a reproducing transducer to perform a movement control by following one of the above reference signals, without the use of special control signals. A reproducing apparatus is controlled by these reference signals for reproducing the rotary recording medium.

Previously, a system records an information signal as a variation of a geometrical shape along a spiral track on a rotary recording medium. Pick up tracking does not require a guide groove for a reproducing stylus, described in U.S. Pat. No. 4,331,976 granted May 25, 1982 and entitled "High Density Recording System Using Side-By-Side Information And Servo Tracks", and U.S. Pat. No. 4,315,283 granted Feb. 9, 1982 and having the same title.

On the rotary recording medium (referred to as "disc" hereinafter) is recorded an information signal such as a television video signal. Also recorded on the disc are first and second pilot or reference signals for tracking control, and a third pilot or reference signal for switching between the first and second reference signals at the time of reproduction. The first and second reference signals are alternately recorded at positions intermediate centerlines of adjacent information signal tracks. The third reference signal is recorded at a predetermined position on every information signal track.

A reproducing system uses a single reproducing element to reproduce the information signal together with the third reference, and the first and second reference signals. A tracking control signal is produced from the first and second reference signals and is switched responsive to the third reference signal separated from the reproduced information signal. The tracking of the reproducing tracing element is controlled by this tracking control signal. The reproducing tracing element traces accurately along the information signal track, even without a guide groove.

In a disc of this character, the track pitch is made very small, for example 1.4 $\mu$m, in order to obtain a high density recording. For this reason, in the recording system, a high precision is required to control the pickup feed, along the disc radial direction. A light beam is used for recording the information signal on the disc. Accordingly, it is very difficult to form an unrecorded portion having a large width at the leading part, in the vicinity of the outer periphery of the disc, as in a conventional audio record disc.

Therefore, in a disc of this character, the track is formed with the normal pitch up to the outer periphery of the disc. It will be supposed that the reproduction of the information signal is to commence within 5 seconds, for example, after the instant when the reproducing tracing element is lowered onto the outer periphery of the disc. For this purpose, in the case where a video signal of 4 fields is recorded for every revolution of the disc, it is necessary that the reproducing tracing element be lowered onto the outer periphery of the disc within 105 $\mu$m of a predetermined place (calculated from $1.4 \times 14 \times 5 = 105$). The disc is rotated at a rotational speed of 900 revolutions per minute. Therefore, as a matter of mechanical precision, it is extremely difficult to lower the reproducing tracing element accurately onto the disc in this manner within the very narrow allowable position range in the order of merely 105 $\mu$m, at the start of reproduction of the disc.

On the other hand, if the allowable range for the descent of the reproducing tracing element is a large value, a long time period is required from the lowering of the reproducing tracing element to the instant when the information signal is reached and the reproduction of the information signal begins.

It is desirable for the allowable range for descent of the reproducing tracing element to be large. Moreover, there is a short time interval from the instant at which the reproducing tracing element is lowered to the instant when reproducing of the information signal starts. The realization of both of these features at the same time has been desired in the art.

Furthermore, it is desirable to automatically return the reproducing transducer to a resting position other than a position over the disc, when the reproducing tracing element finishes reproduction to the innermost periphery of the disc. The start of the next reproduction begins from this resting position.

As one method of realizing these features, the application of the random-access method appears to be possible. More specifically, the method comprises recording beforehand an address signal over the entire track, inclusive of the track portion in the vicinity of the outer periphery of the disc. The reproducing apparatus reads out the difference between the address number of the track turn on which the reproducing tracing element was lowered and the address number of the initial track turn of the information signal, and then quickly displaces the reproducing tracing element until the address number difference becomes zero. Moreover, an operation is performed upon read-out of the final address number, in which the reproducing transducer is returned to the resting position.

By this method, however, an address signal must be recorded beforehand on the disc, and the recording system tends to become complicated. Furthermore, circuits for carrying out address detection and random access control become necessary in the reproducing apparatus, so that the reproducing apparatus becomes unduly complicated and expensive.

Furthermore, another construction can be considered in which the recording is performed without the synchronizing signal of the video signal in the innermost peripheral part of the disc. The existence or non-existence of this synchronizing signal is detected in the reproducing apparatus. In this arrangement, the reproduction transducer is returned to the resting position when the reproducing apparatus detects the non-existence of the synchronizing signal. However, since a PCM disc on which the audio signal is pulse code modulated and recorded, has no synchronizing signal, the above described reproducing apparatus detects the non-existence of the synchronizing signal and returns the reproducing transducer to the resting position immediately upon the start of the reproduction. Accordingly, there is a disadvantage in that the PCM disc cannot be reproduced by the reproducing apparatus of the above described construction.

SUMMARY OF THE INVENTION

Accordingly, a general object of the present invention is to provide a novel and useful rotary recording medium and a reproducing apparatus in which the above described problems have been overcome.

Another object of the invention is to provide a rotary recording medium in which the recording form of one reference signal of the tracking control reference signals is recorded at a predetermined position having a recording form which is different from that at the other recording positions. According to the rotary recording medium of the present invention, there is no need to previously record a special control signal for controlling the reproducing transducer movement in the reproducing apparatus, and the recording can easily be performed.

Another object of the present invention is to provide a rotary recording medium in which the recording length of one reference signal is recorded at the position where the movement control of the reproducing transducer in the reproducing apparatus is performed. This one signal is different from other but similar signals which are recorded at positions other than the position where the movement control of the reproducing transducer in the reproducing apparatus is performed. This recording length of the one reference signal is a length corresponding to the state of the movement control of the reproducing transducer in the reproducing apparatus. Hence, the reproducing apparatus can easily control the movement of the reproducing transducer by discriminating between the recording lengths of control signals.

Still another object of the present invention is to provide apparatus for reproducing a rotary recording medium in which the recording form of one reference signal of the tracking control reference signals is recorded at a predetermined position having a recording form which is different from that at the other recording positions. According to the invention, the control over the movement of the reproducing transducer can easily be performed by a use of a circuit having a simple construction. It is only necessary to add a discriminating circuit for discriminating between the differences in the recorded form of a control signal. These differences may be such things as a variation in the length of the period of the one reference signal as compared to the length of a normal signal. Discrimination may be accomplished by means of a separation circuit for separating the reference signals. This type of separation circuit is inherently included in the reproducing apparatus.

Other objects and further features of the present invention will be apparent from the following detailed description when read in conjunction with the accompanying drawings.

BRIEF DESCRIPTION OF THE DRAWINGS

FIG. 5 is a block diagram showing a first embodiment of a rotary recording medium reproducing apparatus according to the present invention.

DETAILED DESCRIPTION

Figure 1:
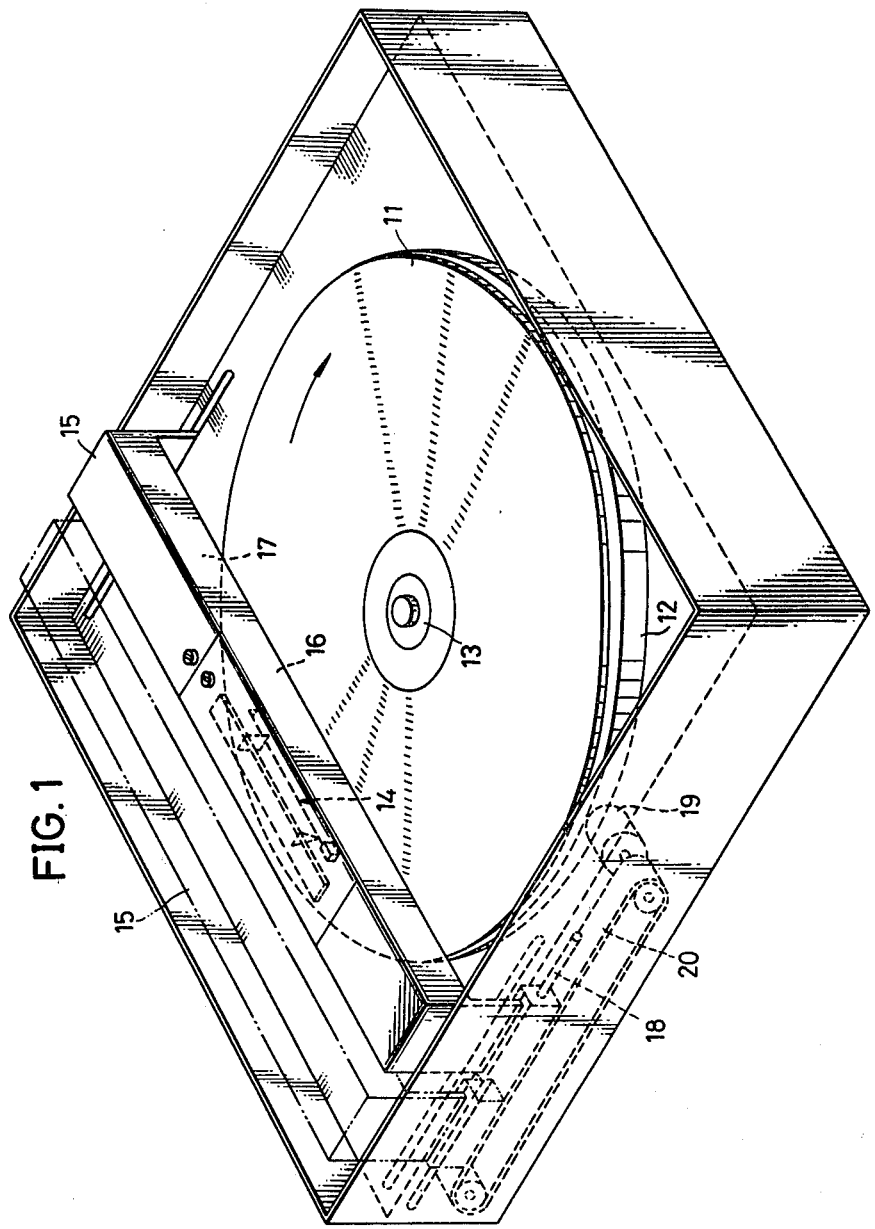
FIG. 1 is a perspective view showing a rotary recording medium reproducing apparatus, to which the inventive high-speed reproducing system can be applied.

The general features of the exterior of an embodiment of an apparatus for reproducing a rotary recording medium is illustrated in FIG. 1. In this apparatus, a disc 11 is a rotary recording medium having a video signal recorded thereon. The disc 11 is set on and clamped to a turntable 12 by a clamper 13. The record disc is thus rotated unitarily with the turntable 12 at a rotational speed of 900 rpm, for example.

A signal pickup device 14 is used as a reproducing transducer. Pickup 14 is mounted at a re-entrant cylindrical cavity resonator 16 within a carriage 15. The pickup is connected to a central conductor (not shown) of the resonator. The central conductor is electro-magnetically connected to a high frequency oscillator 17 for producing a frequency of 1 GHz, for example. This organization is well known. The carriage 15 is disposed horizontally above the turntable 12, and is guided at its ends by a pair of parallel horizontal guide bars 18 (only one shown). This carriage 15 is driven by an endless belt 20, driven by a monitor 19. Carriage 15 moves continuously in horizontal translation at a speed equal to the distance of one track pitch per revolution of the turntable 12, during a normal reproducing mode. Otherwise, the carriage 15 may be driven by a feed screw, driven by the motor 19. As a result of this movement of the carriage 15, a stylus of the signal pickup device 14 travels linearly and radially across the rotating disc 11 and traces the spiral track of the disc 11.

A video signal of, for example, two frames (that is, four fields) is recorded in each revolution. The spiral track is encoded pits formed on the disc 11 responsive to the information content of the signal. One part of this track is shown in an enlarged scale in FIG. 2. Track turns of the single continuous spiral track, corresponding to each revolution of the disc 11, are designated by $t_1, t_2, t_3 \ldots$ Each track turn is constituted by the formation of pits 26 of the main information signal along the plane track path and has no stylus guide groove formed therein. With respect to one track turn $t_1$, once in every horizontal scanning period (H) pits 27, 28 are formed at a position corresponding to the horizontal blanking period. Pits 27 of the first pilot signal fp1 are formed on one lateral side of the track, as viewed in the track path direction. Pits 28 of the second pilot signal fp2 are formed on the other side of the track.

In the intermediate position between the centerlines of adjacent track turns, only one of the pits 27 and 28 of the above mentioned reference signals fp1 and fp2 are formed. Moreover, with respect to any one track turn, the sides on which the pits 27 and 28 are formed are alternated for every successive track turn. That is, if pits 27 and 28 are respectively formed on the right and left sides, of one track turn, for example, pits 28 and 27 will be respectively formed on the right and left sides of each of the adjacent track turns.

The position where the left and right sides of the pits 27 and 28 of the above reference signals fp1 and fp2 interchange, occurs at only one position for each track. This is shown by dotted lines at position 29 in FIG. 3. This position 29 is within the recorded vertical blanking period. A third reference signal fp3 is recorded in the information signal track within the above vertical blanking period. The third reference signal fp3 is originally recorded to be used for servo tracking control to indicate the changing over of the first and second reference signals reproduced by the reproducing apparatus. In information signal recording sections T1, T2, T3, and T4, the third reference signal fp3 is recorded within the vertical blanking period extending for a period 3H, for example.

Furthermore, in the disc 11 according to the present invention, the third reference signal fp3 is recorded for a period equal to eighty horizontal periods ("80H") for each track including the vertical blanking period. For example, this 80H period occurs at a lead-in section T5 on the outer peripheral edge of the information signal recording section T1. This section T5 accommodates 2200 track turns, for example. The third reference signal fp3 is recorded within the vertical blanking period extending for a period 9H for each track. For example, in sections T6, T7, and T8, the 9th period occurs where the information signals of the sections T2, T3, and T4 are not recorded. These sections T6 through T8 accommodate 120 track turns, for example. Moreover, the third reference signal fp3 is recorded during a period 240H for each track including the vertical blanking period, for example, at a lead-out section T9 on the inner side of the information signal recording section T4. This section T9 accommodates for 3000 tracks, for example.

In addition, the information signal recorded on the disc 11 of the present invention can be a video signal or a PCM audio signal.

Figure 4:
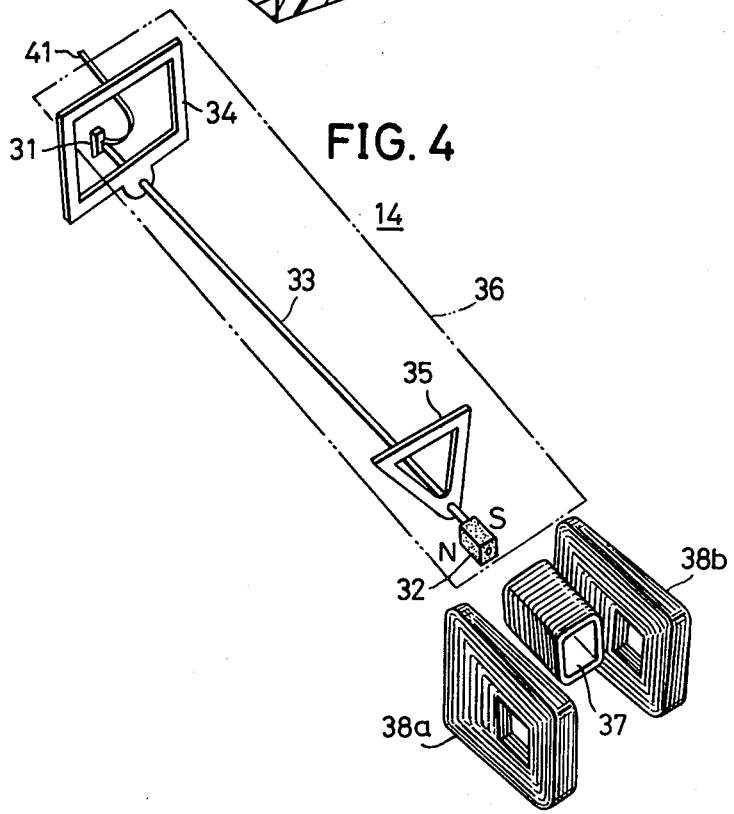
FIG. 4 is an exploded perspective view showing a part of an example of a signal pickup device as a reproducing transducer in a reproducing apparatus indicated in FIG. 1.

One example of the signal pickup device 14 indicated in FIG. 1 will now be described with reference to FIG. 4. This pickup device 14 has a relatively long cantilever arm 33 with a reproducing stylus 31 attached to its distal or free end and a permanent magnet member 32 attached to its proximal or root end. This cantilever arm 33 is supported near its free end by a damper 34, and is held near its root end by a damper 35. Both of these dampers 34 and 35 are fixed to the lower surface of a substantially horizontal support plate 36. The damper 35 may be omitted.

The support plate 36 is fitted in and held by a holding structure. A coil 37 for tracking and a pair of coils 38a and 38b for jitter compensation are fixed on the lower surface of the support plate 36. These coils 38a and 38b are disposed on opposite sides of the tracking coil 37. The above mentioned permanent magnet member 32 is fitted within the tracking coil 37 with gaps formed therebetween.

Figure 2:
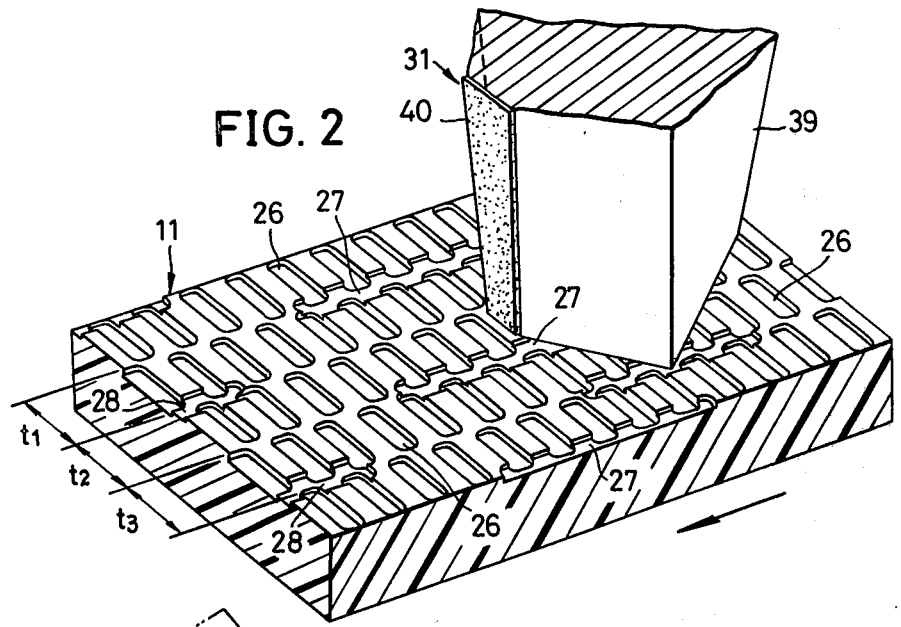
FIG. 2 is a perspective view, on a large scale, showing a part of a rotary recording medium together with a tip part of a reproducing stylus.

The reproducing stylus 31 has a tip having a configuration as indicated in FIG. 2. The reproducing stylus 31 is constituted by a stylus structure 39 having a disc tracing surface which has a width that is greater than the track width. An electrode 40 is fixed to the rear face of the stylus structure 39. The electrode 40 is connected to a metal ribbon 41, as indicated in FIG. 4. As the reproducing stylus 31 traces along a track on the disc 11 rotating in the direction indicated by an arrow of FIG. 2, the video signal recorded thereon by variation of pits is reproduced responsive to variations in the electrostatic capacitance between the surface of the disc 11 and the electrode 40 of the reproducing stylus 31.

Next, an embodiment of a reproducing apparatus of the present invention will be described with reference to FIG. 5. An operation where the reproducing stylus 20 traces the normal information signal recording track part in the sections T1 through T3 shown in FIG. 3 will be first described.

The disc 11 rests on the turntable 12 and rotates together therewith at a rotational speed of 900 rpm., being driven by a motor 51. A reproduced signal is picked up by the reproducing stylus 20, as a minute variation of electrostatic capacitance from the disc 10. The signal thus obtained is supplied to a preamplifier 53 having a resonant circuit. The resonant frequency varies in response to this variation in electrostatic capacitance and is formed into a signal of a desired level. The resulting output of the preamplifier 53 is demodulated into the original information signal by a demodulator 54 and is sent out as an output through an output terminal 55.

The output signal of the preamplifier 53 passes through a low pass filter 56 and an automatic gain control circuit 57. Then, it is respectively supplied to amplifiers 58, 59, and 60. Each of these amplifiers 58, 59, and 60 is a kind of band-pass amplifier, and is designed to have a steep passing frequency characteristic at only the frequencies fp1, fp2, and fp3 respectively. The first pilot signal of frequency fp1 and the second pilot signal of frequency fp2 are obtained separately from the amplifiers 58 and 59, and respectively pass through level adjustors 61 and 62, where their levels are adjusted. The resulting signals are then supplied to a gate switching circuit 63.

Figure 6:
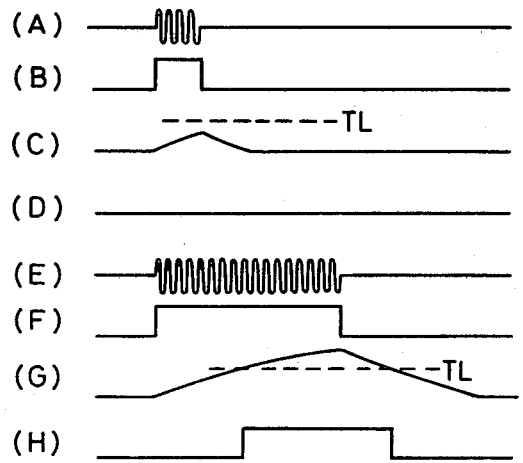
FIGS. 6(A) through 6(H) are graphs respectively showing the signal waveform at each part of the reproducing apparatus of FIG. 5.

The third pilot signal fp3, shown in FIG. 6(A), is obtained from the amplifier 60, and is supplied to and wave-detected at a detecting circuit 64. The resulting output signal of the detecting circuit 64 shown in FIG. 6(B) operates a flip-flop 65. The output signal of the flip-flop 65 is applied to the gate switching circuit 63 as a switching pulse.

Each time that an output switching pulse of the flip-flop 65 is applied to the gate switching circuit 63, the gate switching circuit 63 is switched in a manner indicated by the change-over between the full line and the broken line arrows representing moving contacts, shown schematically in FIG. 5. By this switching operation, each time a switching pulse is applied, the first pilot signal fp1 is supplied alternately to the detecting circuits 66 and 67, while the second pilot signal fp2 is supplies alternately to the detecting circuits 67 and 66. Accordingly, as described above with reference to FIG. 2, the first and second pilot signals fp1 and fp2 on the left and right sides of the track exchange positions at each successive track turn on the disc 11. However, the pilot signal on one side of the track (for example, the outer side as considered in the disc radial direction) is continually supplied to the detecting circuit 66 with respect to all track turns. The pilot signal on the other side of the track (the inner side) is continually supplied to the detecting circuit 67.

The detecting circuit 66 and 67 detect the envelopes of their respective input reference signals and convert the envelopes into DC voltages. These voltages are then supplied to the input terminals of a differential amplifier 68. This differential amplifier 68 compares the output signals of the two detecting circuits 66 and 67 which vary in response to the reproduced levels of the signals fp1 and fp2. Accordingly, the differential amplifier 68 generates an output tracking error signal which indicates the tracking control direction and the error quantity. This control signal is further amplified to a specific level by a known circuitry, and then applied to the coil 37 of the signal pickup apparatus 14.

When the tracing position of the reproducing stylus 31 deviates from the proper tracing track toward the side of an adjacent track, the level of one of the reproduced pilot signals fp1 and fp2 becomes higher than the level of the other pilot signal. A difference is introduced between the levels of the output signals of the detecting circuits 66 and 67. The differential amplifier 68 produces a tracking control current. This current is supplied to the coil 37. Thus, the reproducing stylus 31 is displaced in a direction which is perpendicular to the track longitudinal direction. The displaced distance varies according to the size and direction of the tracking control current. Thus there is a tracking control in which the reproducing stylus 31 accurately traces the track.

On the other hand, the output wave-detected signal of the third reference signal fp3, shown in FIG. 6(B), is wave-detected at the detecting circuit 64, and is supplied to an integrating circuit 69 wherein the signal is integrated, as shown in FIG. 6(C). The output signal of the integrating circuit 69 is applied to a Schmidt trigger circuit 70. The Schmidt trigger circuit 70 has an operational threshold at the level TL shown by dotted lines of FIG. 6(C).

Consider the reproducing stylus 31 of the pickup apparatus 14 tracing and reproducing the section T4, for example. The third reference signal fp3 is reproduced at the position 29 on every complete rotation of the disc 11. Signal fp3 only exists within the period 3H as shown in FIG. 6(A). Hence, the voltage applied from the integrating circuit 69 to the Schmidt trigger circuit 70 is of the form shown in FIG. 6(C), which is lower than the threshold level TL of the Schmidt trigger circuit 70. Therefore, the Schmidt trigger circuit 70 does not operate and its output remains at low level, as shown in FIG. 6(D). This output is not supplied to a length discriminating circuit 71.

The motor 19 continues to rotate at the normal speed upon normal reproduction, and the pickup apparatus 14 is moved at a speed corresponding to one track pitch for every rotation of the disc 11. Moreover, when a third reference signal fp3 having a period of approximately 3H is reproduced, the output signal level of the integrating circuit 69 does not reach the threshold level TL of the Schmidt trigger circuit 70. Accordingly, when a long third reference signal fp3, having a period which is at least 6H is reproduced, the integrating time constant of the integrating circuit 69 and the threshold level TL of the Schmidt trigger circuit 70 are selected. The output signal level of the integrating circuit 69 sufficiently exceeds the above threshold level TL, responsive to the long signal.

When the reproducing stylus 31 of the pickup apparatus 14 finishes tracing and reproducing the section T4, the reproducing stylus 31 traces the lead-out section T9. The third reference signal fp3 is recorded throughout the period of 240H in each track within this section T9, and is reproduced as shown in FIG. 6(E). This reference signal fp3 passes through the band-pass amplifier 60, and is supplied to the detecting circuit 64 wherein it is converted into a signal shown in FIG. 6(F) which has a width equal to the existing period of the above reference signal. The detected output signal of the detecting circuit 64 is integrated into a signal shown in FIG. 6(G) at the integrating circuit 69.

The existing period of the reference signal fp3, reproduced within this lead-out section T9, is longer than that obtained within the section T4. The existing period of the detected signal is also longer. Accordingly, the integrated value of the integrating circuit 69 becomes large, and exceeds the threshold level TL of the Schmidt trigger circuit 70 as shown in FIG. 6(G). Thus, the output signal of the Schmidt trigger circuit 70 becomes as shown in FIG. 6(H) during the period in which the output integrated value of the integrating circuit 69 exceeds the threshold level TL of the Schmidt trigger circuit 70. The output signal of the Schmidt trigger circuit 70 is supplied to the length discriminating circuit 71 which responds to the length of the existing period of the signal shown in FIG. 6(H).

Since the length of the output signal of the Schmidt trigger circuit 70 corresponds to the length of the existing period of the reference signal fp3, the length of the existing period of the reference signal fp3 can be discriminated by discriminating the output signal length of the Schmidt trigger circuit 70, by a use of the length discriminating circuit 71. Accordingly, discrimination can be made on where the reproduced and detected reference signal fp3 was recorded. That is, discrimination identifies the section in which the reference signal was recorded.

Figure 3:
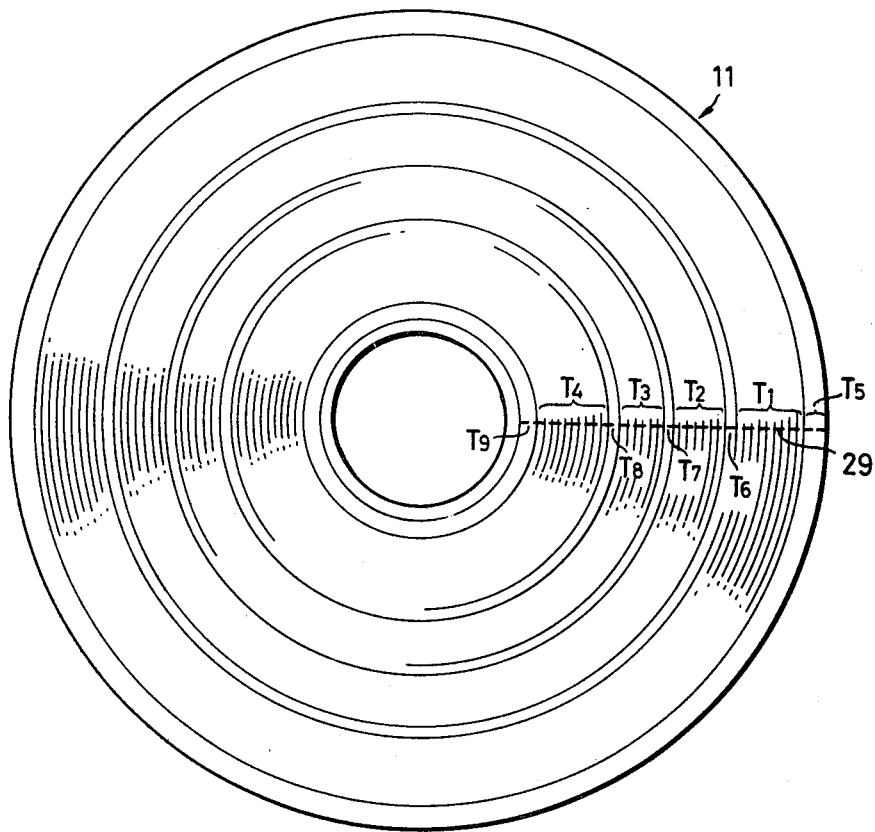
FIG. 3 is a plan view showing an embodiment of a rotary recording medium according to the present invention.

In the above case, the length discriminating circuit 71 identifies the reproduced signal recorded in the lead-out section T9, throughout the period 240H, and supplied the resulting discriminated signal to a motor driving control circuit 72. Since the motor driving control circuit 72 drives the motor 19 in the reverse direction at a high speed, the pickup apparatus 14 is moved at a high speed in a direction opposite to the direction used during the reproduction, after the reproduction at the section T4 (FIG. 3). The pickup is thus returned to a resting position, away from the disc 11.

Hence, when the pickup apparatus 14 finishes reproducing the innermost periphery information signal recording section T4 and enters the lead-out section T9, the pickup apparatus 14 automatically returns to the resting position, to wait for the next reproducing instruction.

Next, when a reproduction starting operation is performed upon starting of the reproduction, a reproducing starting signal is supplied to the motor driving control circuit 72 from a terminal 73. The motor 19 rotates until the reproducing stylus 31 of the pickup apparatus 14 reaches a position within the lead-in section T5 from the resting position. The reference signal fp3 recorded in the section T5 is reproduced when the reproduction is started upon the lowering of the reproducing stylus 31, at a position within the lead-in section T5. In this case, a signal having a period length corresponding to the existing period length (80H in the case of the present embodiment) of the reference signal fp3 is reproduced within the section T5 as in the above case. This fp3 signal is supplied from the Schmidt trigger circuit 70 to the length discriminating circuit 71.

Accordingly, responsive to the length of the signal applied thereto, the length discriminating circuit 71 detects that a reference signal of the section T5 was reproduced. Moreover, the motor 19 is rotated in the forward direction at a high speed by the motor driving control circuit 72. Therefore, the reproducing stylus 31 is moved in a fast-forward manner regardless of the position where reproducing stylus 31 lands within the section T5. This position may change due to the instability of the reproducing apparatus. Thus, the reproducing stylus 31 can quickly pass through the lead-in section T5. Hence, even when the lead-in section T5 is wide, the reproduction of the information signal can begin within a short time, as a result of the reproduction starting operation.

When the reproducing stylus 31 passes through the section T5 and enters within the section T1, no output is introduced from the Schmidt trigger circuit 70 since the period of the reproduced reference signal fp3 is only of the period 3H. Thus, the motor driving control circuit 72 changes over the rotational speed of the motor 19 into the rotational speed upon normal reproduction.

Furthermore, when the section T2 is to be reproduced without reproducing the section T1, a fast-forward signal is supplied from the terminal 74 to the motor driving control circuit 72, when a fast-forward operation is performed. Hence, the motor 19 rotates in the forward direction at a high speed. The pickup apparatus 14 is accordingly moved in a fast-forward manner in the forward direction. When the reproducing stylus 31 starts to trace the section T6, a reference signal fp3 recorded throughout the period 9H is reproduced. Accordingly, the length discriminating circuit 71 discriminates the length of the signal supplied from the Schmidt trigger circuit 70 which is respective of the reference signal fp3 of the period 9H. Thus, the motor 19 is rotated in the forward direction at a medium speed, and the pickup apparatus 14 is moved at a medium speed.

When the reproducing stylus 31 then starts to reproduce the section T2, no output is introduced from the Schmidt trigger circuit 70 since the period of the reproduced reference signal fp3 is only the period 3H. Thus, the motor driving control circuit 72 changes over the rotational speed of the motor 19 into the rotational speed upon normal reproduction. Accordingly, normal reproduction can automatically be performed from the desired section T2 within a short time.

Moreover, when only one of the above-described operations is to be performed, that is, when only the operation to return the pickup apparatus 14 into the resting position upon finishing of the reproduction is to be performed, for example, there is no need for the length discriminating circuit 71. In addition, the construction of the motor driving control circuit 72 can be simple. The motor 19 is accordingly rotated at a high speed in the reverse direction responsive to the output signal of the Schmidt trigger circuit 70 shown in FIG. 6(H).

In the above embodiment of the invention, the third reference signal fp3 is used as a signal to vary the existing period; however, one or both of the first and second reference signals fp1 and fp2 can be used.

According to the disc and disc reproducing apparatus of the present invention, it is unnecessary to record a special control signal to perform the above described operations. The recording of the disc is simple since it uses only one of the three reference signals originally used for tracking operation. Furthermore, the reproducing apparatus needs on special control signal detecting circuit, and the circuit construction is simplified.

Further, this invention is not limited to these embodiments but various variations and modifications may be made without departing from the scope of the invention.

What is claimed is:

1. A rotary recording medium comprising: a continuous spiral main track including main track turns having an information signal recorded thereon and specific track turns having no information signal recorded thereon; and a continuous spiral reference signal track disposed between adjacent track turns of the main track and having first and second tracking control reference signals recorded alternately for every complete track turn of said reference signal track, said main track having a third reference signal recorded thereon for a specific existence period at respective positions corresponding to the positions where the first and second reference signals change on the reference signal track turns, said specific track turns of the main track having the third reference signal recorded thereon with a predetermined existence period which is longer than said specific existence period of the main track turns.

2. A rotary recording medium as claimed in claim 1 in which said specific track turns comprise lead-in track turns on the outermost side of the main track and lead-out track turns on the innermost side of the main track, said lead-in track turns having said third reference signals recorded with a first predetermined existence period which is longer than said specific existence period of the main track turns, said lead-out track turns having said third reference signal recorded with a second predetermined existence period which is longer than said specific existence period of the main track turns, but which is different from the first predetermined existence period.

3. A rotary recording medium as claimed in claim 2 in which said main track turns comprise a plurality of information signal recorded parts respectively having different information signals recorded thereon, said specific track turns further comprise at least one specific part existing between said information signal recorded parts, and said specific part has said third reference signal recorded thereon with a third predetermined existence period which is longer then said specific existence period of the main track turns, but which is different from the first and second predetermined existence period.

4. A reproducing apparatus for reproducing a rotary recording medium, said rotary recording medium comprising: a continuous signal main track including main track turns having an information signal recorded thereon and specific track turns having no information signal recorded thereon; and a continuous spiral reference signal track disposed between adjacent track turns of the main track and having first and second tracking control reference signals alternately for every complete track turn of said reference signal track, said main track having a third reference signal recorded thereon with a specific existence period at respective positions corresponding to the positions where positions of the first and second reference signals change on the reference signal track turns, said specific track turns of the main track having the third reference signal recorded thereon with a predetermined existence period which is longer than said specific existence period of the main track turns, said reproducing apparatus comprising:

a reproducing tracing element for reproducing the signals from said recording medium;

comparing means for comparing the level differences between first and second reference signals reproduced from said reference signal track by said reproducing tracing element, to produce an output control signal;

switching means for switching the first and second reference signals thus reproduced, in response to the third reference signal reproduced from said main track by said reproducing tracing element, and for supplying the switched signals to said comparing means;

tracking control means supplied with said output control signal, for controlling the tracking of said reproducing tracing element;

discriminating means for discriminating the third reference signal having said predetermined existence period produced by said reproducing tracing element; and transfer control means for controlling the transfer of said reproducing tracing element by the output of said discriminating means.

5. A reproducing apparatus as claimed in claim 4 in which said specific track turns of said rotary recording medium comprise lead-in track turns on the outermost side of the main track and lead-out track turns on the innermost side of the main track, said lead-in track turns having said third reference signal recorded with a first predetermined existence period which is longer than said specific existence period of the main track turns, said lead-out track turns having said third reference signal recorded with a second predetermined existence period which is longer than said specific existence period of the main track turns but which is different from the first predetermined existence period, said discriminating means discriminating said first predetermined existence period, whereby said transfer control means transfer said reproducing tracing element at high speed from a position at said lead-in track turns to a position at the outermost periphery of said main track turns, and discriminating said second existence period, whereby said transfer control means transfer said reproducing tracing element from a position at said lead-out track turns to at resting position which is other than on said rotary recording medium.

6. A reproducing apparatus as claimed in claim 5 in which said main track turns comprise a plurality of information signal recorded parts respectively having different information signals recorded thereon, said specific track turns further comprising at least one specific part existing between said information signal recorded parts, and said specific part has said third reference signal recorded thereon with a third predetermined existence period which is longer than said specific existence period of the main track turns but which is different from the first and second predetermined existence period, said discriminating means discriminating said third predetermined existence period, whereby said transfer control means transfer said reproducing tracing element at high speed from a position at said specific part to an outermost position of said information signal recorded part adjacent to the innermost side of said specific part.

* * * * *